United States Patent
Vohra

(10) Patent No.: US 10,413,882 B1
(45) Date of Patent: Sep. 17, 2019

(54) POLYPROPYLENE, POLYESTER, NEWSPAPER PRINT, AND VERMICULITE SORBENT

(71) Applicant: Druv Vohra, Naperville, IL (US)

(72) Inventor: Druv Vohra, Naperville, IL (US)

(73) Assignee: Druv Vohra, Naperville, IL (US)

( * ) Notice: Subject to any disclaimer, the term of this patent is extended or adjusted under 35 U.S.C. 154(b) by 0 days.

(21) Appl. No.: 16/053,573

(22) Filed: Aug. 2, 2018

(51) Int. Cl.
| | | |
|---|---|---|
| *B01J 20/26* | (2006.01) | |
| *B01D 17/02* | (2006.01) | |
| *C02F 1/28* | (2006.01) | |
| *B01J 20/16* | (2006.01) | |
| *B01J 20/22* | (2006.01) | |
| *C02F 103/08* | (2006.01) | |
| *C02F 101/32* | (2006.01) | |

(52) U.S. Cl.
CPC ........ *B01J 20/261* (2013.01); *B01D 17/0202* (2013.01); *B01J 20/165* (2013.01); *B01J 20/22* (2013.01); *B01J 20/262* (2013.01); *C02F 1/28* (2013.01); *C02F 1/281* (2013.01); *C02F 1/285* (2013.01); *C02F 2101/32* (2013.01); *C02F 2103/08* (2013.01)

(58) Field of Classification Search
CPC ........ B01J 20/26; B01J 20/262; B01J 20/165; B01J 20/22; B01D 17/0202
USPC ........................................................ 502/402
See application file for complete search history.

(56) References Cited

U.S. PATENT DOCUMENTS 8,785,347 B2 * 7/2014 Belisle ..................... B01J 20/22
502/401

* cited by examiner

*Primary Examiner* — Edward M Johnson

(57) ABSTRACT

In oil spill clean-up, a sorbent is material that is used to absorb oil and repel water. Sorbents are used very frequently, but many of them tend to be expensive or inefficient. Based on extensive research, it is found that a combination of polypropylene, polyester, reclaimed newspaper print, and vermiculite makes a very effective filler for a sorbent. It is concluded after many trials that a composition of 48.63% polypropylene, 27.97% polyester, 12.53% newspaper print, and 10.87% vermiculite in a sorbent absorbs the most oil and repels the most water. A non-provisional utility patent will protect this ratio and introduce a competitive, cost-effective, and eco-friendly sorbent into the market.

1 Claim, No Drawings

POLYPROPYLENE, POLYESTER, NEWSPAPER PRINT, AND VERMICULITE SORBENT

I. BACKGROUND OF INVENTION

In 2010, one of the most catastrophic blows to the environment occurred during the BP oil spill. An estimated 206 million gallons of crude oil leaked into the Gulf of Mexico, enough oil to power a Toyota Prius to go around the Earth's equator 184,181 times (Repanich, 2010, para. 1). Oil spills occur very frequently, and cause enormous ecological harm. From the impact on wildlife to the effects on the environment, oil spills are poisonous to almost all living organisms.

In chemistry, a sorbent is defined as a substance that collects molecules of another substance. As a result, sorbents are frequently used in the process of cleaning up oil spills, specifically through the means of two different procedures; adsorbing, where the oil is attracted to the sorbent surface, but the oil does not penetrate into the material (Mithra, 2012, para.9), or absorbing, where the oil actually penetrates into the pores of the sorbent (Gobson, 2010, para. 7). When comparing the efficiency of sorbents in oil spill clean-up, the most effective sorbents are both oleophilic and hydrophobic, meaning that they are attracted to oil and repel water.

For obvious reasons, sorbent use is a logical option for cleaning up oil spills. However, the current sorbents in the market tend to be very costly, and paradoxically, some are even hazardous to the environment.

Backed by gold award winning research at the Annual State Exposition of the Illinois Junior Academy of Science, it is verified that the sorbents of vermiculite, newspaper print, and polyester, are widely available, cost-reducing, and efficient options in comparison to leading inorganic sorbents, such as pure polypropylene, that are currently taking over the market. Oil-Out sorbents take advantage of this breakthrough research by incorporating the perfect balance of these materials to produce an efficient, cost-effective sorbent.

II. SUMMARY OF INVENTION

Based off extensive independent research, the combination of 48.63% polypropylene, 27.97% polyester, 12.53% reclaimed newspaper print, and 10.87% vermiculite filler to make a sorbent is the most effective in absorbing oil and repelling water. A utility patent is designed to protect this exact ratio when manufacturing sorbent material.

III. DETAILED DESCRIPTION OF INVENTION

The invention is a sorbent comprised of 48.63% polypropylene, 27.97% polyester, 12.53% reclaimed newspaper print, and 10.87% vermiculite. All of these materials are ground up and mixed uniformly together, and will be used as a filler in a sock or boom to be applied on the site of an oil spill. This sorbent technology will absorb the oil in the spill, while repelling the water, and will perform at a very high rate of speed and efficiency. There is currently no sorbent on the market that combines all of these individual materials in this ratio.

The invention claimed is:

1. A composition of sorbent material comprising: 48.63% polypropylene; 27.97% polyester; 12.53% reclaimed newspaper print; and 10.87% vermiculite to efficiently absorb oil and repel water.

* * * * *